US008887078B2

(12) United States Patent
Leeb et al.

(10) Patent No.: US 8,887,078 B2
(45) Date of Patent: Nov. 11, 2014

(54) CONFIGURATION OF CUSTOM CONTROLS IN DATA-DRIVEN ENVIRONMENTS

(75) Inventors: Gunter Leeb, Redmond, WA (US); Gersh Payzer, Redmond, WA (US); Quetzal Bradley, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 1003 days.

(21) Appl. No.: 12/966,870

(22) Filed: Dec. 13, 2010

(65) Prior Publication Data

US 2012/0151395 A1    Jun. 14, 2012

(51) Int. Cl.
*G06F 3/048* (2013.01)
*G06F 9/44* (2006.01)

(52) U.S. Cl.
CPC ................. *G06F 9/4443* (2013.01)
USPC ........................................ 715/765

(58) Field of Classification Search
CPC ............................................. G06F 9/4443
USPC ......................................... 715/765, 762, 763
See application file for complete search history.

(56) References Cited

U.S. PATENT DOCUMENTS

| | | | |
|---|---|---|---|
| 6,222,537 B1 | 4/2001 | Smith et al. | |
| 6,229,524 B1 | 5/2001 | Chernock et al. | |
| 6,583,798 B1 | 6/2003 | Hoek et al. | |
| 7,802,229 B2 * | 9/2010 | Kornerup et al. | 717/109 |
| 8,099,664 B2 * | 1/2012 | Kureshy et al. | 715/705 |
| 8,108,763 B2 * | 1/2012 | Gao et al. | 715/209 |
| 2002/0194217 A1 * | 12/2002 | Hoffman et al. | 707/503 |
| 2004/0111424 A1 * | 6/2004 | Roman et al. | 707/100 |
| 2004/0135808 A1 | 7/2004 | Sagara et al. | |
| 2007/0180066 A1 | 8/2007 | Sherwood et al. | |
| 2008/0033956 A1 * | 2/2008 | Saha et al. | 707/9 |
| 2009/0199185 A1 * | 8/2009 | Slawson et al. | 718/100 |

FOREIGN PATENT DOCUMENTS

| | | |
|---|---|---|
| WO | WO9507510 | 3/1995 |
| WO | WO0137170 A | 5/2001 |

OTHER PUBLICATIONS

"About OpenDX", Published Date: Published Date: 2002 3 pages; http://www.opendx.org.html.
Damer, et al., "Data-Driven Virtual Environment Assembly and Operation", Published Date: Mar. 31-Apr. 2, 2004; 16 pages.

* cited by examiner

*Primary Examiner* — Omar Abul-Ali
(74) *Attorney, Agent, or Firm* — Nicholas Chen; Kate Drakos; Micky Minhas

(57) ABSTRACT

The subject disclosure relates to systems and methods for providing custom controls configuration. In one embodiment, a system comprises a custom controls component configured to receive view information associated with a default view of controls, and receive customized configuration information indicative of a customization of at least one aspect of the controls. The default view of controls is based on data and default configuration information, and the data and the default configuration information are represented via a data-driven programming language. The custom control component is also configured to generate a customized view of the controls based, at least, on the default view of the controls and the customized configuration information. The configuration information comprises metadata, and the customized view of the controls includes a modified view, help text, or a description of a field associated with the controls.

20 Claims, 10 Drawing Sheets

400

```
PSEUDO CODE – RECORD VIEW CONFIGURATION
{

ViewState: Record =
  {
     FullName = {RecordView:Category = "BasicInformation" },
     Email = {RecordView:Category = "BasicInformation" },
     Title = {RecordView:Category = "BasicInformation" },
     EmployeeIdentifier = {RecordView:Category = "DetailedInformation" },
     ServiceAwardDate = {RecordView:Category = "DetailedInformation" },
  },
  RecordView:Sections =
  {
      MainSection = { IsExpanded = true, DisplayName = "Basic Information"},
      AdvancedSection = { IsExpanded = false, DisplayName = "Detailed Information"},
  } ^+ { View:PropertiesWindow =
          {
           DisplayName = "TextBox",
           IsExpanded = "CheckBox",
           RecordView: Category = "DropDown",      402
          }
       }
}
```

Record View

Basic Information
   FullName
   Email
   Title

Detailed Information
   EmployeeIdentifier
   ServiceAwardDate

Properties User Interface for Record View

DisplayName

IsExpanded ✓

Category    Basic Information ▽

FIG. 6

CONFIGURATION OF CUSTOM CONTROLS IN DATA-DRIVEN ENVIRONMENTS

TECHNICAL FIELD

The subject disclosure generally relates to providing configuration of custom controls in data-driven environments.

BACKGROUND

Conventional systems and applications, such as those that allow the generation of forms such as a forms application, typically have hard-coded and pre-defined properties for display of controls for viewing the data that is provided. As such, the data and/or properties and options for displaying the controls are typically pre-defined by the system or application. The properties and options that can be employed in the design of the display are those that have been pre-configured and/or coded into the system or application by the system or application designer.

EXCEL® is one such system. As another example, the VISUAL STUDIO® integrated development environment (IDE) has a nominal typing system and a class represents the instance of data. How the property designer displays such controls for displaying data is determined by a developer who has previously pre-defined the class. Further, another distinguishing quality of VISUAL STUDIO® is that the IDE utilizes traditional programming as opposed to data-driven programming, such as, the M programming language, for example. Utilizing traditional programming can be limiting relative to the opportunities for providing configuration custom controls using data-driven environments.

The above-described background information and deficiencies of current systems are merely intended to provide an overview of some of the background information and problems of conventional systems and applications that employ traditional programming languages, and are not intended to be exhaustive. The above-described deficiencies of today's systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Various embodiments as provided herein are targeted for data-driven environments. The controls for generating views of data are typically pre-defined by the system or application.

In one embodiment, a custom controls configuration system comprises a custom controls component. The custom controls component is configured to receive view information associated with a default view of controls. The default view of controls is based on data and default configuration information, and the data and the default configuration are represented via a data-driven programming language. The custom controls component is also configured to receive customized configuration information indicative of a customization of at least one aspect of the controls. The custom controls component then generates a customized view of the controls based, at least, on the default view of the controls and the customized configuration information.

In some embodiments, methods or computer readable storage media for configuring custom controls are described. For example, one method includes receiving view information associated with a default view of controls, and receiving customized configuration information indicative of a customization of at least one aspect of the controls. The method then includes generating a customized view of the controls based, at least, on the default view of the controls and the customized configuration information. In some embodiments, the default view of controls is based on data and default configuration for the data, and the data and the default configuration are represented via a data-driven programming language.

In one or more of the above embodiments, the customized configuration information, for configuring views of controls, comprises metadata.

In some embodiments, generating the customized view of the controls comprises overriding the default view of the controls to generate the customized view of the controls based, at least, on the metadata. In some embodiments, generating the customized view of the controls comprises generating help text associated with a property of the controls, wherein the help text is based, at least, on the metadata.

These and other embodiments are described in more detail below.

BRIEF DESCRIPTION OF THE DRAWINGS

Various non-limiting embodiments are further described with reference to the accompanying drawings in which:

FIG. 4 is a screenshot showing an exemplary non-limiting implementation of pseudocode for facilitating customization of controls in accordance with one or more embodiments;

FIG. 5 is a block diagram showing an exemplary non-limiting implementation of a record view based on the pseudocode of FIG. 4 in accordance with one or more embodiments;

FIG. 6 is a block diagram showing an exemplary non-limiting implementation of a properties user interface for the record view of FIG. 5 in accordance with one or more embodiments;

DETAILED DESCRIPTION

Overview of Exemplary Programming Language

Figure 1:
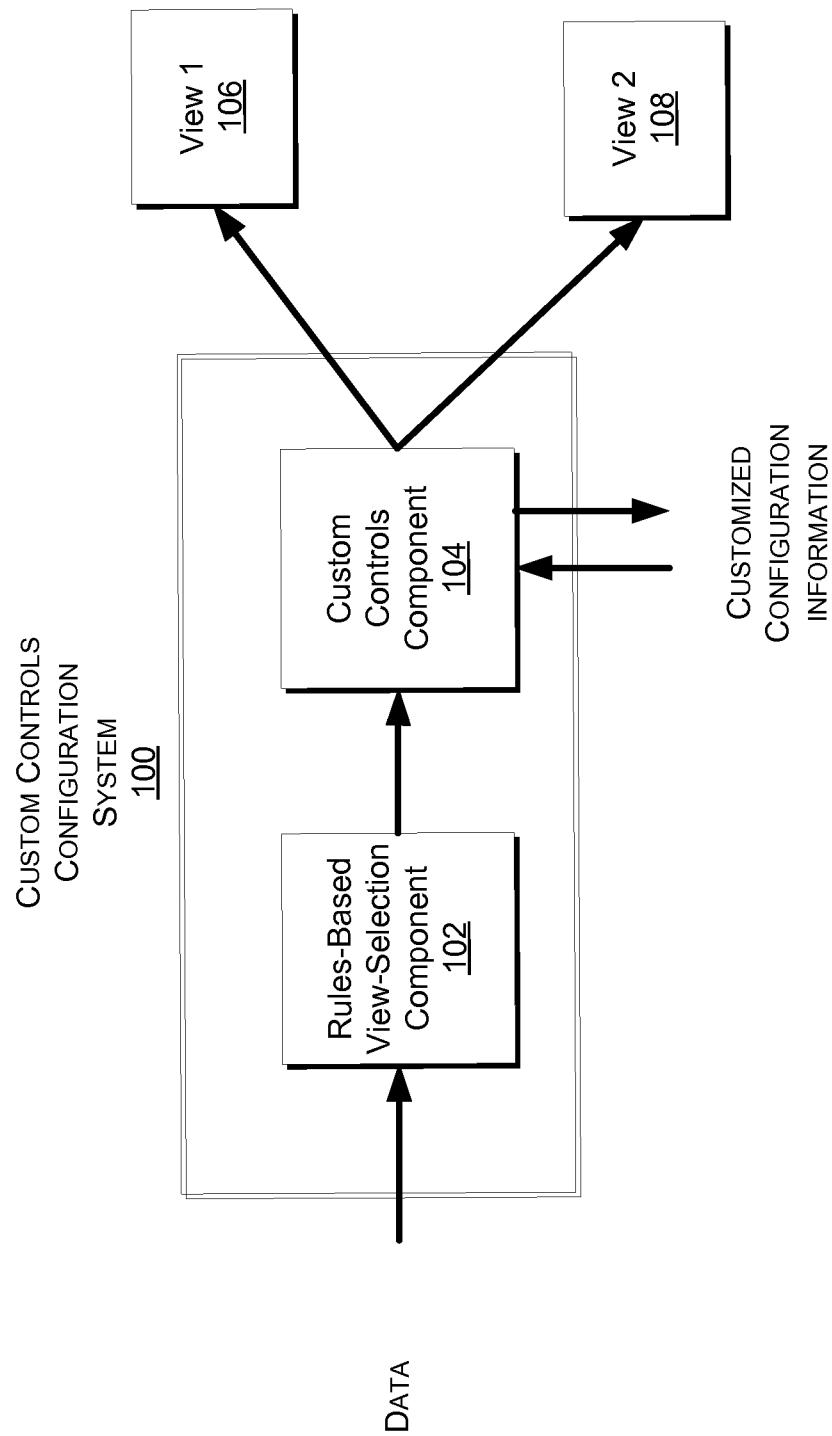
FIG. 1 is a block diagram showing an exemplary non-limiting implementation of a custom controls configuration system in accordance with one or more embodiments.

By way of introduction, an exemplary declarative language that is compatible with the scope and spirit of the embodiments described herein is the M programming language (hereinafter "M"), which was developed by the assignee of the present application. However, in addition to M, it is to be understood that other similar programming languages may be used, and that the utility of the invention is not limited to any single programming language. It is to be further understood that, because M is an evolving newly developed programming language, the particular syntaxes in the exemplary codes provided herein may vary with future syntaxes without departing from the scope and spirit of the subject application. A brief description of M is provided below.

M is a data driven language. Data driven means that, unlike traditional coding languages, most constructs are expressed as name, value pairs. In such an environment, embodiments described herein are quite useful for giving developers the ability to configure custom controls.

M lets users determine how they want to structure and query their data using a convenient textual syntax that is both authorable and readable. An M program consists of one or more source files, known formally as compilation units, wherein the source file is an ordered sequence of Unicode characters. Source files typically have a one-to-one correspondence with files in a file system, but this correspondence is not required. For maximal portability, it is recommended that files in a file system be encoded with the UTF-8 encoding.

Conceptually speaking, an M program is compiled using four steps: 1) Lexical analysis, which translates a stream of Unicode input characters into a stream of tokens (Lexical analysis evaluates and executes preprocessing directives); 2) Syntactic analysis, which translates the stream of tokens into an abstract syntax tree; 3) Semantic analysis, which resolves all symbols in the abstract syntax tree, type checks the structure and generates a semantic graph; and 4) Code generation, which generates executable instructions from the semantic graph for some target runtime (e.g. SQL, producing an image). Further tools may link images and load them into a runtime.

M doesn't mandate how data is stored or accessed, nor does it mandate a specific implementation technology. Rather, M was designed to allow users to write down what they want from their data without having to specify how those desires are met against a given technology or platform. That stated, M in no way prohibits implementations from providing rich declarative or imperative support for controlling how M constructs are represented and executed in a given environment.

M builds on three basic concepts: values, types, and extents. Hereinafter, these three concepts are defined as follows: 1) a value is simply data that conforms to the rules of the M language, 2) a type describes a set of values, and 3) an extent provides dynamic storage for values.

In general, M separates the typing of data from the storage/extent of the data. A given type can be used to describe data from multiple extents as well as to describe the results of a calculation. This allows users to start writing down types first and decide where to put or calculate the corresponding values later.

A general principle of M is that a given value may conform to any number of types. This is a departure from the way many object-based systems work, in which a value is bound to a specific type at initialization-time and is a member of the finite set of subtypes that were specified when the type was defined.

Another type-related operation that bears discussion is the type ascription operator (:). The type ascription operator asserts that a given value conforms to a specific type.

In general, when values in expressions are seen, M has some notion of the expected type of that value based on the declared result type for the operator/function being applied. For example, the result of the logical and operator (&&) is declared to be conformant with type "Logical."

It is occasionally useful (or even required) to apply additional constraints to a given value—typically to use that value in another context that has differing requirements. For example, consider the following simple type definition:

type SuperPositive: Number where value>5;

And let's now assume that there's a function named "CalcIt" that is declared to accept a value of type "SuperPositive" as an operand. It would be desirable for M to allow expressions like this:

CalcIt(20)
CalcIt(42+99)

and prohibit expressions like this:

CalcIt(−1)
CalcIt(4)

In fact, M does exactly what is wanted for these four examples. This is because these expressions express their operands in terms of simple built-in operators over constants. All of the information needed to determine the validity of the expressions is readily and cheaply available the moment the M source text for the expression is encountered.

However, if the expression draws upon dynamic sources of data and/or user-defined functions, the type ascription operator is used to assert that a value will conform to a given type.

To understand how the type ascription operator works with values, let's assume that there is a second function, "GetVowelCount," that is declared to accept an operand of type "Text" and return a value of type "Number" that indicates the number of vowels in the operand.

Since it cannot be known based on the declaration of "GetVowelCount" whether its results will be greater than five or not, the following expression is not a legal M expression:

CalcIt(GetVowelCount(someTextVariable))

Because the declared result type (Number) of "GetVowelCount" includes values that do not conform to the declared operand type of "CalcIt" (SuperPositive), M assumes that this expression was written in error and will refuse to even attempt to evaluate the expression.

When this expression is rewritten to the following (legal) expression using the type ascription operator:

CalcIt((GetVowelCount(someTextVariable): SuperPositive))

M is essentially being told that there is enough understanding of the "GetVowelCount" function to know that a value that conforms to the type "SuperPositive" will be returned. In short, the programmer is telling M that he/she knows what it is doing.

But what if the programmer does not know? What if the programmer misjudged how the "GetVowelCount" function works and a particular evaluation results in a negative number? Because the "CalcIt" function was declared to only accept values that conform to "SuperPositive," the system will ensure that all values passed to it are greater than five. To ensure this constraint is never violated, the system may need to inject a dynamic constraint test that has a potential to fail when evaluated. This failure will not occur when the M source text is first processed (as was the case with CalcIt(-1))—rather it will occur when the expression is actually evaluated.

Here, the general principle is as follows. M implementations will typically attempt to report any constraint violations before the first expression in an M document is evaluated. This is called static enforcement and implementations will manifest this much like a syntax error. However, some constraints can only be enforced against live data and therefore require dynamic enforcement.

In general, the M philosophy is to make it easy for users to write down their intention and put the burden on the M implementation to "make it work." However, to allow a particular M document to be used in diverse environments, a fully featured M implementation is to be configurable to reject M documents that rely on dynamic enforcement for correctness in order to reduce the performance and operational costs of dynamic constraint violations.

M also defines a type constructor for specifying collection types. The collection type constructor restricts the type and count of elements a collection may contain. All collection types are restrictions over the intrinsic type "Collection," which all collection values conform to:
{ } in Collection
{1, false} in Collection
! ("Hello" in Collection)

The last example is interesting in that it demonstrates that the collection types do not overlap with the simple types. There is no value that conforms to both a collection type and a simple type.

A collection type constructor specifies both the type of element and the acceptable element count. The element count is typically specified using one of the three operators:
T*—zero or more Ts
T+—one or more Ts
T#m . . . n—between m and n Ts.

The collection type constructors can either use Kleene operators or be written longhand as a constraint over the intrinsic type Collection—that is, the following two type declarations describe the same set of collection values:
type SomeNumbers: Number+;
type TwoToFourNumbers: Number#2 . . . 4;
type ThreeNumbers: Number#3;
type FourOrMoreNumbers: Number#4 . . . ;

These types describe the same sets of values as these longhand definitions:
type SomeNumbers: Collection where value.Count>=1
&& item in Number;
type TwoToFourNumbers: Collection where value.Count>=2
&& value.Count<=4
&& item in Number;
type ThreeNumbers: Collection where value.Count==3
&& item in Number;
type FourOrMoreNumbers: Collection where value.Count>=4
&& item in Number;

Independent of which form is used to declare the types, the following can now be asserted:
!({ } in TwoToFourNumbers)
!({"One", "Two", "Three"} in TwoToFourNumbers)
{1, 2, 3} in TwoToFourNumbers
{1, 2, 3} in ThreeNumbers
{1, 2, 3, 4, 5} in FourOrMoreNumbers The collection type constructors compose with the "where" operator, allowing the following type check to succeed:

{1, 2} in (Number where value<3)* where value.Count % 2==0
note that the inner "where" operator applies to elements of the collection, and the outer "where" operator applies to the collection itself.

Just as collection type constructors can be used to specify what kinds of collections are valid in a given context, the same can be done for entities using entity types.

An entity type declares the expected members for a set of entity values. The members of an entity type can be declared either as fields or as calculated values. The value of a field is stored; the value of a calculated value is computed. All entity types are restrictions over the Entity type, which is defined in the M standard library.

Here is the simplest entity type:
type MyEntity: Language.Entity;

The type "MyEntity" does not declare any fields. In M, entity types are open in that entity values that conform to the type may contain fields whose names are not declared in the type. That means that the following type test:
{X=100, Y=200} in MyEntity
will evaluate to true, as the "MyEntity" type says nothing about fields named X and Y.

Most entity types contain one or more field declarations. At a minimum, a field declaration states the name of the expected field:
type Point {X; Y;}

This type definition describes the set of entities that contain at least fields named X and Y irrespective of the values of those fields. That means that the following type tests:

---

{ X = 100, Y = 200 } in Point
{ X = 100, Y = 200, Z = 300 } in Point // more fields than expected OK
!({ X = 100 } in Point) // not enough fields - not OK
{ X = true, Y = "Hello, world" } in Point

--- will all evaluate to true.

The last example demonstrates that the "Point" type does not constrain the values of the X and Y fields—any value is allowed. A new type that constrains the values of X and Y to numeric values can now be written:

--- type NumericPoint {
  X : Number;
  Y : Number where value > 0;
}

---

Note that type ascription syntax is used to assert that the value of the X and Y fields must conform to the type "Number." With this in place, the following expressions:
{X=100, Y=200} in NumericPoint
{X=100, Y=200, Z=300} in NumericPoint
!({X=true, Y="Hello, world"} in NumericPoint)
!({X=0, Y=0} in NumericPoint)
all evaluate to true.

As was seen in the discussion of simple types, the name of the type exists only so that M declarations and expressions can refer to it. That is why both of the following type tests succeed:
{X=100, Y=200} in NumericPoint
{X=100, Y=200} in Point
even though the definitions of NumericPoint and Point are independent.

Fields in M are named units of storage that hold values. M allows you to initialize the value of a field as part of an entity initializer. However, M does not specify any mechanism for changing the value of a field once it is initialized. In M, it is assumed that any changes to field values happen outside the scope of M.

A field declaration can indicate that there is a default value for the field. Field declarations that have a default value do not require conformant entities to have a corresponding field specified (such field declarations are sometimes called optional fields). For example, consider this type definition:

```
type Point3d {
    X : Number;
    Y : Number;
    Z = -1 : Number; // default value of negative one
}
```

Because the Z field has a default value, the following type test will succeed:
{X=100, Y=200} in Point3d
Moreover, if a type ascription operator is applied to the value:
({X=100, Y=200}: Point3d)
the Z Field can now be accessed like this:
({X=100, Y=200}: Point3d).Z
This expression will yield the value −1.

If a field declaration does not have a corresponding default value, conformant entities must specify a value for that field. Default values are typically written down using the explicit syntax shown for the Z field of "Point3d." If the type of a field is either nullable or a zero-to-many collection, then there is an implicit default value for the declaring field of null for optional and { } for the collection.

For example, consider this type:

```
type PointND {
    X : Number;
    Y : Number;
    Z : Number?; // Z is optional
    BeyondZ : Number*; // BeyondZ is optional too
}
```

Again, the following type test will succeed:
{X=100, Y=200} in PointND
and ascribing the "PointND" to the value will allow these defaults to be obtained:
({X=100, Y=200}: PointND).Z==null
({X=100, Y=200}: PointND).BeyondZ=={ }
The choice of using a zero-to-one collection or nullable type vs. an explicit default value to model optional fields typically comes down to style.

Calculated values are named expressions whose values are calculated rather than stored. An example of a type that declares such a calculated value is:

```
type PointPlus {
    X : Number;
    Y : Number;
    // a calculated value
    IsHigh( ) : Logical { Y > 0; }
}
```

Note that unlike field declarations which end in a semicolon, calculated value declarations end with the expression surrounded by braces.

Like field declarations, a calculated value declaration may omit the type ascription, as this example does:

```
type PointPlus {
    X : Number;
    Y : Number;
    // a calculated value with no type ascription
    InMagicQuadrant( ) { IsHigh && X > 0; }
    IsHigh( ) : Logical { Y > 0; }
}
```

When no type is explicitly ascribed to a calculated value, M will infer the type automatically based on the declared result type of the underlying expression. In this example, because the logical and operator used in the expression was declared as returning a "Logical," the "InMagicQuadrant" calculated value also is ascribed to yield a "Logical" value.

The two calculated values just defined and used did not require any additional information to calculate their results other than the entity value itself. A calculated value may optionally declare a list of named parameters whose actual values are specified when using the calculated value in an expression. Here's an example of a calculated value that requires parameters:

```
type PointPlus {
    X : Number;
    Y : Number;
    // a calculated value that requires a parameter
    WithinBounds(radius : Number) : Logical {
        X * X + Y * Y <= radius * radius;
    }
    InMagicQuadrant( ) { IsHigh && X > 0; }
    IsHigh( ) : Logical { Y > 0; }
}
```

To use this calculated value in an expression, one must provide values for the two parameters:
({X=100, Y=200}: PointPlus).WithinBounds(50)
When calculating the value of "WithinBounds," M will bind the value 50 to the symbol radius—this will cause the "WithinBounds" calculated value to evaluate to false.

It is useful to note that both calculated values and default values for fields are part of the type definition, not part of the values that conform to the type. For example, consider these three type definitions:

```
type Point {
    X : Number;
    Y : Number;
}
type RichPoint {
    X : Number;
    Y : Number;
    Z = -1 : Number;
    IsHigh( ) : Logical { X < Y; }
}
type WeirdPoint {
    X : Number;
    Y : Number;
    Z = 42 : Number;
    IsHigh( ) : Logical { false; }
}
```

Because RichPoint and WeirdPoint only have two fields (X and Y), the following can be stated:
{X=1, Y=2} in RichPoint
{X=1, Y=2} in WeirdPoint
However, the "IsHigh" calculated value is only available when one of these two types to the entity value are ascribed:
({X=1, Y=2}: RichPoint).IsHigh==true
({X=1, Y=2}: WeirdPoint).IsHigh==false Because the calculated value is purely part of the type and not the value, when the ascription is chained like this:

(({X=1, Y=2}: RichPoint): WeirdPoint).IsHigh==false

It's the outer-most ascription that determines which function is called.

A similar principle is at play with respect to how default values work. Again, the default value is part of the type, not the entity value. When the following expression is written:

({X=1, Y=2}: RichPoint).Z==−1 the underlying entity value still only contains two field values (1 and 2 for X and Y respectively). Where default values differ from calculated values is when ascriptions are chained. For example, consider the following expression:

(({X=1, Y=2}: RichPoint): WeirdPoint).Z==−1

Because the "RichPoint" ascription is applied first, the resultant entity has a field named Z whose value is −1, however, there is no storage allocated for the value (it's part of the type's interpretation of the value). When the "WeirdPoint" ascription is applied, the result of the first ascription is being applied, which does have a field named Z, so that value is used to specify the value for Z—the default value specified by "WeirdPoint" is not needed.

Like all types, a constraint may be applied to an entity type using the "where" operator. Consider the following type definition:

```
type HighPoint {
    X : Number;
    Y : Number;
} where X < Y;
```

In this example, all values that conform to the type "HighPoint" are guaranteed to have an X value that is less than the Y value. That means that the following expressions:

{X=100, Y=200} in HighPoint
! ({X=300, Y=200} in HighPoint)

both evaluate to true

Now consider the following type definitions:

```
type Point {
    X : Number;
    Y : Number;
}
type Visual {
    Opacity : Number;
}
type VisualPoint {
    DotSize : Number;
} where value in Point && value in Visual;
```

The third type, "VisualPoint," names the set of entity values that have at least the numeric fields X, Y, Opacity, and DotSize.

Because it is a common desire to factor member declarations into smaller pieces that can be easily composed, M provides explicit syntax support for this. The "VisualPoint" type definition can be rewritten using that syntax:

```
type VisualPoint : Point, Visual {
    DotSize : Number;
}
```

To be clear, this is just shorthand for the long-hand definition above that used a constraint expression. Both of these definitions are equivalent to this even longer-hand definition:

```
type VisualPoint = {
    X : Number;
    Y : Number;
    Opacity : Number;
    DotSize : Number;
}
```

Again, the names of the types are just ways to refer to types—the values themselves have no record of the type names used to describe them.

M also extends LINQ query comprehensions with several features to make authoring simple queries more concise. The keywords, "where" and "select" are available as binary infix operators. Also, indexers are automatically added to strongly typed collections. These features allow common queries to be authored more compactly as illustrated below.

As an example of where as an infix operator, this query extracts people under 30 from the "People" collection defined above:

from p in People
where p.Age=30
select p

An equivalent query can be written:

People where value.Age=30

The "where" operator takes a collection on the left and a Boolean expression on the right. The "where" operator introduces a keyword identifier value in to the scope of the Boolean expression that is bound to each member of the collection. The resulting collection contains the members for which the expression is true. The expression:

Collection where Expression is exactly equivalent to:

from value in Collection
where Expression
select value

The M compiler adds indexer members on collections with strongly typed elements. For the collection "People," the compiler adds indexers for "First(Text)," "Last(Text)," and "Age(Number)."

Collection.Field (Expression)

is equivalent to:

from value in Collection
where Field==Expression
select value

"Select" is also available as an infix operator. Consider the following simple query:

from p in People
select p.First+p.Last

This computes the "select" expression over each member of the collection and returns the result. Using the infix "select" it can be written equivalently as:

People select value.First+value.Last

The "select" operator takes a collection on the left and an arbitrary expression on the right. As with "where," "select" introduces the keyword identifier value that ranges over each element in the collection. The "select" operator maps the expression over each element in the collection and returns the result. The expression:

Collection select Expression is exactly equivalent to:

from value in Collection
select Expression

A trivial use of the "select" operator is to extract a single field:

People select value.First

The compiler adds accessors to the collection so single fields can be extracted directly as "People.First" and "People.Last."

To write a legal M document, all source text must appear in the context of a module definition. A module defines a top-level namespace for any type names that are defined. A module also defines a scope for defining extents that will store actual values, as well as calculated values.

Here is a simple module definition:

```
module Geometry {
    // declare a type
    type Point {
        X : Integer; Y : Integer;
    }
    // declare some extents
    Points : Point*;
    Origin : Point;
    // declare a calculated value
    TotalPointCount { Points.Count + 1; }
}
```

In this example, the module defines one type named "Geometry.Point." This type describes what point values will look like, but doesn't mention any locations where those values can be stored.

This example also includes two module-scoped fields (Points and Origin). Module-scoped field declarations are identical in syntax to those used in entity types. However, fields declared in an entity type simply name the potential for storage once an extent has been determined; in contrast fields declared at module-scope name actual storage that is mapped by an implementation in order to load and interpret the module.

Modules may refer to declarations in other modules by using an import directive to name the module containing the referenced declarations. For a declaration to be referenced by other modules, the declaration is explicitly exported using an export directive.

For example, consider this module:

```
module MyModule {
    import HerModule; // declares HerType
    export MyType1;
    export MyExtent1;
    type MyType1 : Logical*;
    type MyType2 : HerType;
    MyExtent1 : Number*;
    MyExtent2 : HerType;
}
```

Note that only "MyType1" and "MyExtent1" are visible to other modules. This makes the following definition of "HerModule" legal:

```
module HerModule {
    import MyModule; // declares MyType1 and MyExtent1
    export HerType;
    type HerType : Text where value.Count < 100;
    type Private : Number where !(value in MyExtent1);
    SomeStorage : MyType1;
}
```

As this example shows, modules may have circular dependencies.

The types of the M language are divided into two main categories: intrinsic types and derived types. An intrinsic type is a type that cannot be defined using M language constructs but rather is defined entirely in the M Language Specification. An intrinsic type may name at most one intrinsic type as its super-type as part of its specification. Values are an instance of exactly one intrinsic type, and conform to the specification of that one intrinsic type and all of its super types.

A derived type is a type whose definition is constructed in M source text using the type constructors that are provided in the language. A derived type is defined as a constraint over another type, which creates an explicit subtyping relationship. Values conform to any number of derived types simply by virtue of satisfying the derived type's constraint. There is no a priori affiliation between a value and a derived type—rather a given value that conforms to a derived type's constraint may be interpreted as that type at will.

M offers a broad range of options in defining types. Any expression which returns a collection can be declared as a type. The type predicates for entities and collections are expressions and fit this form. A type declaration may explicitly enumerate its members or be composed of other types.

M is a structurally typed language rather than a nominally typed language. A type in M is a specification for a set of values. Two types are the same if the exact same collection of values conforms to both regardless of the name of the types. It is not required that a type be named to be used. A type expression is allowed wherever a type reference is required. Types in M are simply expressions that return collections.

If every value that conforms to type A also conforms to type B, it can be said that A is a subtype of B (and that B is a super-type of A). Subtyping is transitive, that is, if A is a subtype of B and B is a subtype of C, then A is a subtype of C (and C is a super-type of A). Subtyping is reflexive, that is, A is a (vacuous) subtype of A (and A is a super-type of A).

Types are considered collections of all values that satisfy the type predicate. For that reason, any operation on a collection can be applied to a type and a type can be manipulated with expressions like any other collection value.

M provides two primary means for values to come into existence: computed values and stored values (also known as fields). Computed and stored values may occur with both module and entity declarations and are scoped by their container. A computed value is derived from evaluating an expression that is typically defined as part of M source text. In contrast, a field stores a value and the contents of the field may change over time.

For the avoidance of doubt, the M programming language is provided as the context for various embodiments set forth herein with respect to the above-mentioned type system and corresponding type checking for a declarative programming model and language. However, it can be appreciated that the various embodiments described herein can be applied to any declarative programming languages having the same or similar capabilities of M with respect to its programming constructs, type system and other defining characteristics.

Thus, for instance, any declarative language including a type system supporting typecasing or type membership expressions in refinement types as set forth in one or more embodiments is contemplated herein, not just embodiments predicated on the M programming language. Moreover, while M is a suitable source of exemplary pseudo-code and conceptual illustration as found herein, such examples are to be considered representative of concepts, and not limited by any particularities of M. Also, "M" is also sometimes called the "D" programming language, although for consistency, references to "D" are not used herein.

Various embodiments as provided herein are targeted for providing configuration of custom controls in data-driven environments. In one embodiment, a custom controls configuration system comprises a custom controls component. The custom controls component is configured to receive view information associated with a default view of controls. The default view of controls is based on data and default configuration for the data, and the data and the default configuration are represented via a data-driven programming language. The custom controls component is also configured to receive customized configuration information indicative of a customization of at least one aspect of the controls. The custom controls component then generates a customized view of the controls based, at least, on the default view of the controls and the customized configuration information.

In some embodiments, methods or computer readable storage media for configuring custom controls are described. For example, one method includes receiving view information associated with a default view of controls, and receiving customized configuration information indicative of a customization of at least one aspect of the controls. The method then includes generating a customized view of the controls based, at least, on the default view of the controls and the customized configuration information. In some embodiments, the default view of controls is based on data and default configuration information, and the data and the default configuration are represented via a data-driven programming language.

In one or more of the above embodiments, the customized configuration information comprises metadata.

In some embodiments, generating the customized view of the controls comprises overriding the default view of the controls to generate the customized view of the controls based, at least, on the metadata. In some embodiments, generating the customized view of the controls comprises generating help text associated with a property of the controls, wherein the help text is based, at least, on the metadata. In some embodiments, generating the customized view of the controls comprises modifying the default view of the controls to include indicia of a description of a field associated with the controls.

Herein, an overview of some of the embodiments for achieving customization of controls has been presented above. As a roadmap for what follows next, various exemplary, non-limiting embodiments and features for customization of controls are described in more detail. Then, some non-limiting implementations and examples are given for additional illustration, followed by representative network and computing environments in which such embodiments and/or features can be implemented.

Configuration of Custom Controls in Data-Driven Environments

It is to be appreciated, however, that the embodiments provided herein are not intended to be limited to any specific data-driven programming language or environment implementation, unless explicitly stated otherwise. Further, unless stated otherwise, the hereto appended claims are not intended to be limited to any custom controls configuration systems or methods.

By way of further description with respect to one or more non-limiting aspects of custom controls configuration designs that can generate customized views of user interface (UI) controls, various non-limiting characteristics associated with exemplary schemes that can be implemented can be achieved. For example, in some embodiments, the custom controls configuration system employs a rules-based system to select a default view. View selection logic is employed to generate the default view. The default view is selected based on the data and the properties associated with the data. The custom controls configuration system then employs metadata to enable developers to override the default view selection logic and/or specify further details to be displayed (e.g., a particular view of controls, help text and/or indicia of descriptive information about the controls or fields of information displayed). In some embodiments, there is a set of pre-defined metadata that the custom controls configuration system can interpret as help text in some embodiments. This metadata can be recognized and employed by the developer inputting the metadata to generate the help text.

By way of further description, FIG. 1 is a block diagram showing an exemplary non-limiting implementation of custom controls configuration system 100 in accordance with one or more embodiments.

In some embodiments, the custom controls configuration system 100 is included in the QUADRANT™ web-based integrated development environment (IDE). The QUADRANT™ page designer contains a toolbox of web controls that end users can use to construct applications. An out of box set of controls (e.g., tables, buttons, lists, charts, graphs, forms) can be provided for the users and, and/or developers can create their own controls.

When a control is dropped onto the page, the user can customize the control using the custom controls configuration system 100 as described herein. For instance, the configuration properties for a table could be show/hide columns, table name, rows to display, etc. As such, the custom controls configuration system 100 can enable developers who want to create custom controls in a data driven environment. The customized controls can be created with the custom controls component 104 described below.

As shown in FIG. 1, the custom controls configuration system 100 includes a rules-based view-selection component 102 that is configured with pre-defined rules for the controls to be used to display data received at the rules-based view-selection component 102. The rules-based view-selection component 102 can also operate on default configuration information that is associated with the data to determine the default controls. For example, the data can be displayed in many different format including, but not limited to, a table, chart or graph and the rules-based view-selection component 102 determines the format of the controls based, at least, on the rules pre-defined in the rules-based view-selection component 102.

The rules-based view-selection component 102 outputs a default view of controls (or information indicative of generating a default view of controls) via a UI. The data and the default configuration are represented via a data-driven programming language in some embodiments. For example, the data-driven programming language can be the M programming language. As such, the default view can be a view associated with aspects of information included in the source code of the M programming language.

Accordingly, the UI or information generated for display by the UI, are, in some embodiments, views on the data-driven language source code (such as that shown and described with reference to FIGS. 4, 5 and 6 below). These views are visualized as different views of controls, in some embodiments.

As also shown in FIG. 1, the custom controls configuration system 100 includes a custom controls component 104. The custom controls component 104 is configured to receive view information associated with a default view of controls, and/or the default view of the controls. The customs controls component 104 can also be configured to receive customized configuration information indicative of a desired customization of at least one aspect of the controls. The customized configuration information can be designed and/or input from a user of the custom controls configuration system 100 desiring modification of the default view generated by the rules-based view-selection component 102.

The joint use of the data in conjunction with configuration information (e.g., enables a view to be generated). As such, non-data-driven languages that closely associate data and the metadata for the data can be employed in the embodiments described herein.

In various embodiments described herein, the customized configuration information is expressed in the form of, or includes, metadata. As such, a data, metadata pair such as that employed in data-driven programming languages can be utilized together to display and/or customize default views of controls displaying the data. As such, through metadata, the developer can further tailor the configuration generated by the rules-based view-selection component 102.

The use of the customized configuration information can be recursive in nature as the custom controls component 104 can receive the customized configuration information includes data and configuration information in some embodiments. As such, in some cases, further modification of the customized configuration information (or further modification of the customization based on the customized configuration information) can occur. In some embodiments, for example, the customization can be applied at different levels of granularity within the controls. For example, with a table, the customization can be applied to a component within the table and, within that component, to one or more components at a next level down. As another example, if a low level component is changed, and has a dependency on another location in the table, the associated location could be automatically changed also.

Figure 2:
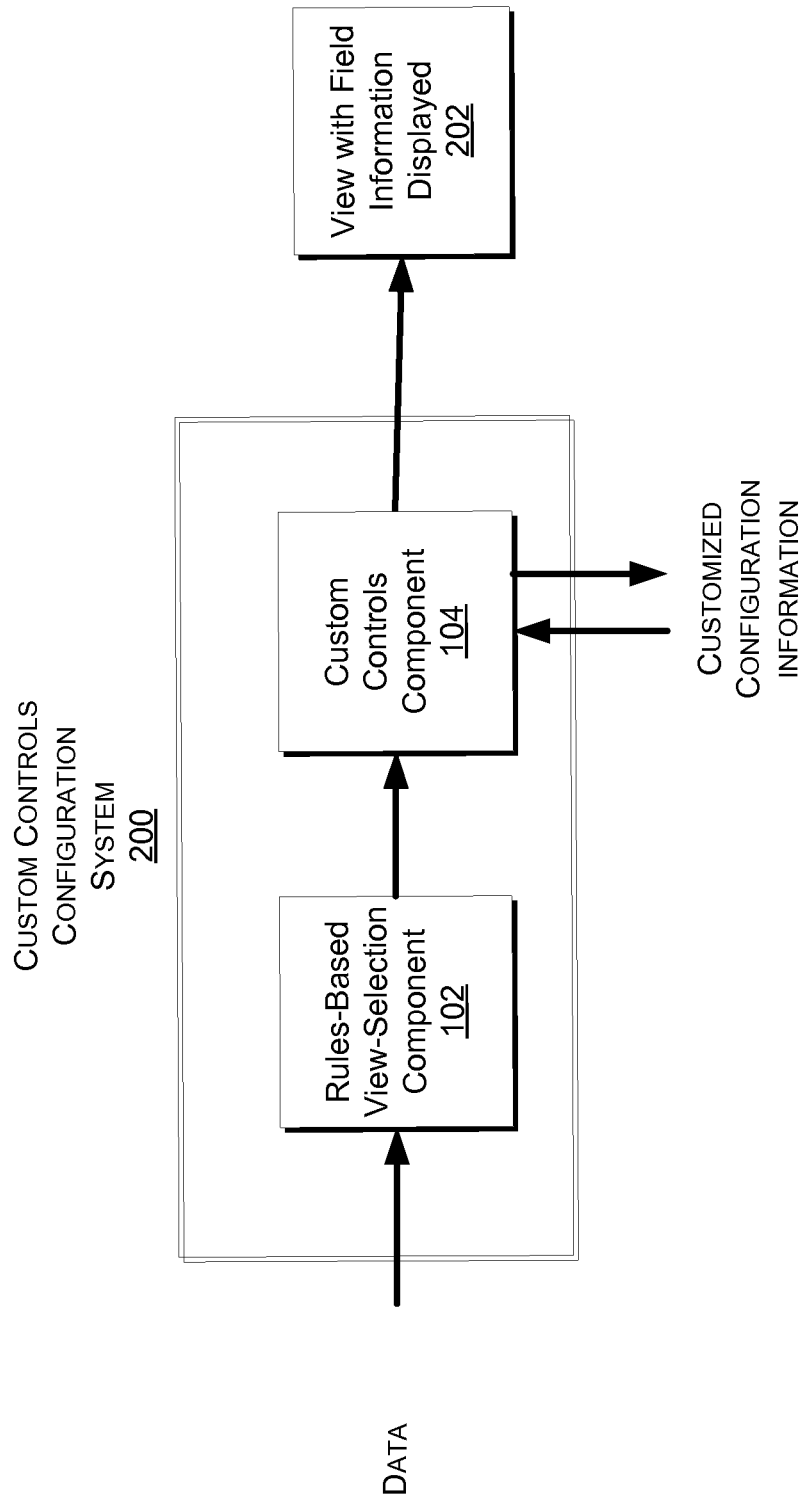
FIG. 2 is a block diagram showing an exemplary non-limiting implementation of a custom controls configuration system in accordance with one or more embodiments.
Figure 3:
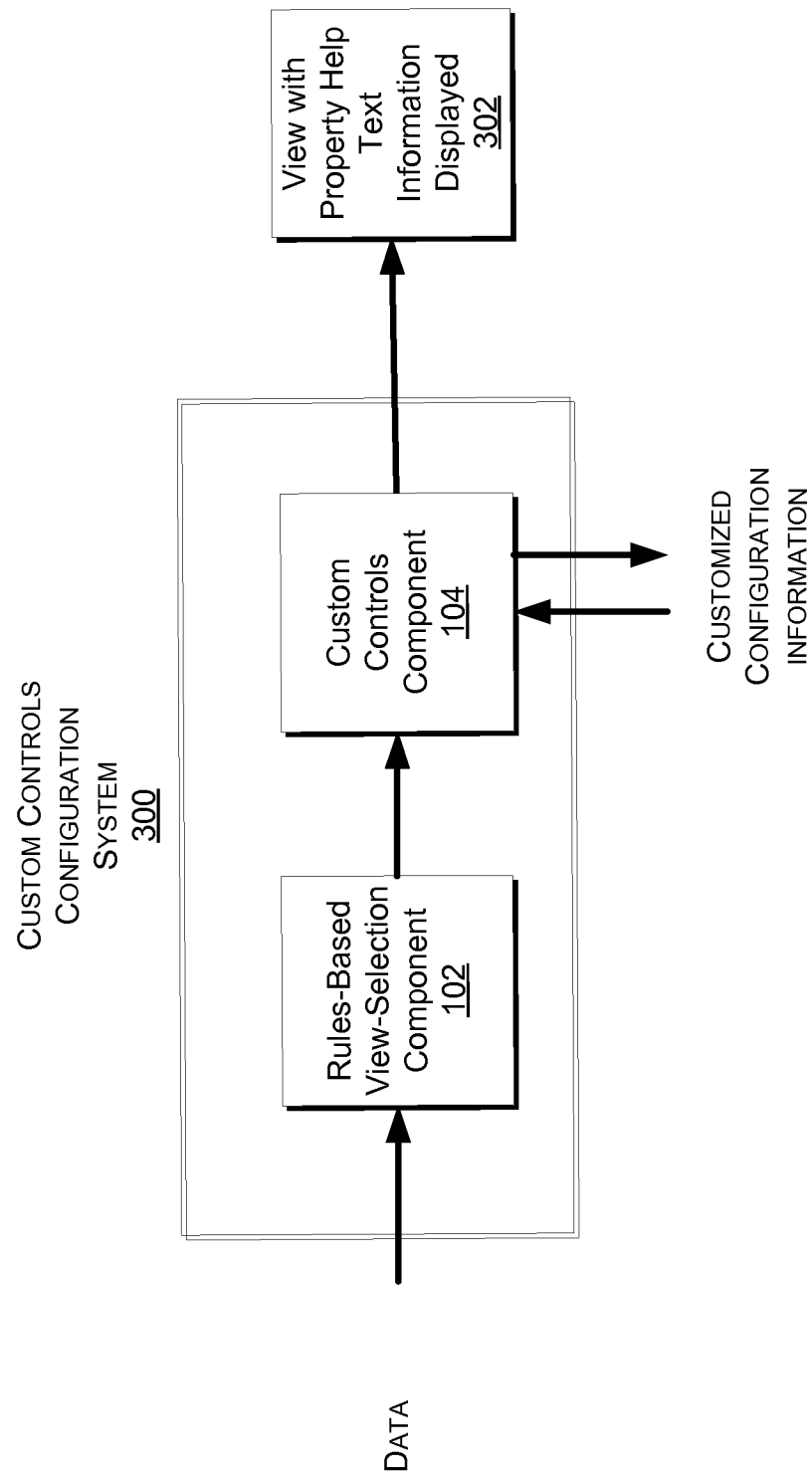
FIG. 3 is a block diagram showing an exemplary non-limiting implementation of a custom controls configuration system in accordance with one or more embodiments.

FIGS. 2 and 3 are block diagrams showing exemplary non-limiting implementations of custom controls configuration systems in accordance with one or more embodiments.

Referring to FIGS. 1, 2 and 3, the customized controls information can be customized in different non-limiting embodiments. As shown in FIG. 1, the custom controls component 104 is configured to receive a default view in a first format (e.g., table) and generate a customized view (e.g., modification from a table to a chart or graph) by overriding the default view based, at least, on the customized controls information received. The default view comprises a first representation of the controls and the customized view comprises a second representation of the controls. The first and second representations differ in some respect as dictated by the customized configuration information received at the custom controls component 104. Accordingly, as shown in FIG. 1, the custom controls component 104 can select (based on the customized configuration information) a first view 106 or a second view 108 (each being a modification over the default view received by the custom controls component 104). In this manner, metadata can be used to override the default view generated.

In another embodiment, if a developer created data indicative of a custom list and exposed a property called "display icon." The default view generated could be a checkbox. If the developer wants the property to be displayed as a dropdown instead, the developer can generate customized configuration information (e.g., metadata) to override the checkbox and cause a dropdown to be displayed instead of the checkbox.

Now turning to FIG. 2, the custom controls component 104 is configured to receive a default view of a control and the default view of the controls is then modified to include indicia of a description of a field associated with the controls. For example, the custom controls component 104 can receive a view of (or information for generating a view of) a chart with numerous fields, and can modify the view (or information for generating the view) to include visual or textual indicia of information about one or more of the fields of the chart. The modification is based on the customized configuration information e.g., metadata. As another example, with regard to security, the indicia could be a visual depiction of a lock and such can be displayed near or in association with a field that has increased security requirements for accessing the field. For example, the field could be an encrypted field or a field that requires additional security (e.g., an additional password to be entered) to access the field.

Now turning to FIG. 3, the custom controls component 104 is configured to receive a default view of a control and modify the default view of the controls by generating and/or associating help text with the controls or a property of the controls. The modification is based on the customized configuration information e.g., metadata. The help text can specify information (such as the purpose of the property) to the end user as the property name may not be self-explanatory.

FIG. 4 is a screenshot showing an exemplary non-limiting implementation of pseudocode for facilitating customization of controls in accordance with one or more embodiments. FIG. 5 is a block diagram showing an exemplary non-limiting implementation of a record view based on the pseudocode of FIG. 4 in accordance with one or more embodiments. FIG. 6 is a block diagram showing an exemplary non-limiting implementation of a properties UI for the record view of FIG. 5 in accordance with one or more embodiments.

With reference to FIGS. 4, 5 and 6, the pseudocode 402 of a record view configuration is shown in FIG. 4 and describes the manner of displaying controls information for properties as shown in FIGS. 5 and 6.

As shown in FIGS. 4 and 5, FullName, Email, Title are displayed in association with Basic Information, and EmployeeIdentifier and ServiceAwardDate are displayed in association with Detailed Information.

As shown in FIGS. 4 and 6, DisplayName is displayed in association with a text box, IsExpanded is displayed in association with a checkbox, and Category is displayed in association with a dropdown.

Figure 7:
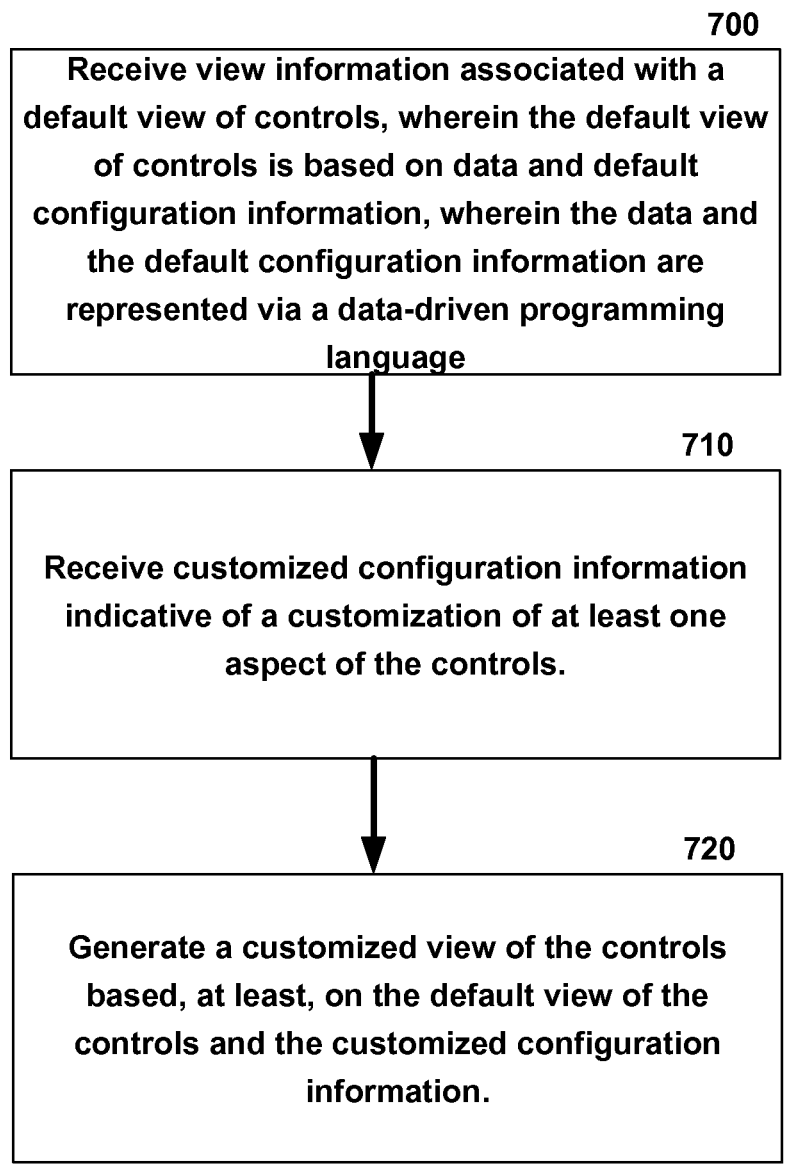
FIG. 7 is a flow diagram illustrating an exemplary non-limiting process for a custom controls configuration system.

FIG. 7 is a flow diagram illustrating an exemplary non-limiting process for configuration of a custom controls system. At 700, view information associated with a default view of controls is received. The default view of controls is based on data and default configuration information. The data and the default configuration are represented via a data-driven programming language.

At 710, customized configuration information indicative of a customization of at least one aspect of the controls is received. At 720, a customized view of the controls based, at least, on the default view of the controls and the customized configuration information, is generated. In some embodiments, the customized configuration information is, or comprises, metadata.

The customized controls information can be customized in different non-limiting embodiments. As one example, a default view is received in a first format (e.g., table) and a customized view (e.g., modification from a table to a chart or graph) is generated by overriding the default view based, at least, on the customized controls information received. The default view comprises a first representation of the controls and the customized view comprises a second representation of the controls. The first and second representations differ in some respect as dictated by the customized configuration information received. Based on the customized configuration information, a first view or a second view (each being a modification over the default view) can be generated. In this manner, metadata can be used to override the default view generated.

In another embodiment, if a developer created data indicative of a custom list and exposed a property called "display icon," the default view generated could be to display the property as a checkbox. If the developer wants the property to be displayed as a dropdown, the developer can generate customized configuration information (e.g., metadata) to override the checkbox display, and display a dropdown instead of a checkbox.

In another example, customization can include receiving a default view of a control and modifying the default view of the controls to include indicia of a description of a field associated with the controls. For example, a view of a chart with numerous fields can be received and the view can be modified to include visual or textual indicia of information about one or more of the fields. The modification is based on the customized configuration information e.g., metadata. As another example, with regard to security, the indicia could be a visual depiction of a lock and such can be displayed near or in association with a field that has increased security requirements for access of the field. For example, the field could be an encrypted field or a field that requires additional security (e.g., an additional password to be entered) to access the field.

In another example, customization can include receiving a default view of a control and modifying the default view by generating and/or associating help text with the controls or a property of the controls. The modification is based on the customized configuration information e.g., metadata. The help text can specify information such as the purpose of the property to the end user as the property name may not be self-explanatory.

Figure 8:
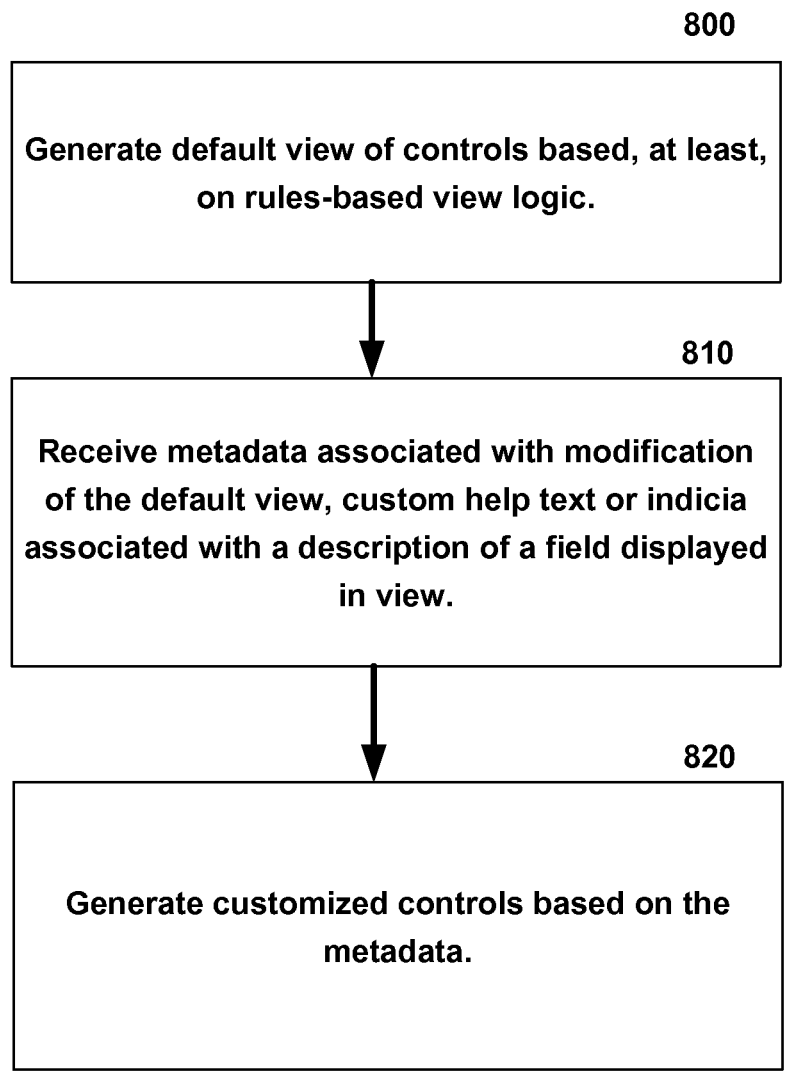
FIG. 8 is another flow diagram illustrating an exemplary non-limiting process for a custom controls configuration system.

FIG. 8 is another flow diagram illustrating an exemplary non-limiting process for configuration of a custom controls system. At 800, a default view based, at least, on rules-based view logic is generated. At 810, metadata associated with modification to a customized view, custom help text or indicia associated with a description of a field displayed in the view is received. At 820, customized controls based on the metadata are generated.

Exemplary Networked and Distributed Environments

One of ordinary skill in the art can appreciate that the various embodiments of the custom controls configuration systems and methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the transaction management mechanisms as described for various embodiments of the subject disclosure.

Figure 9:
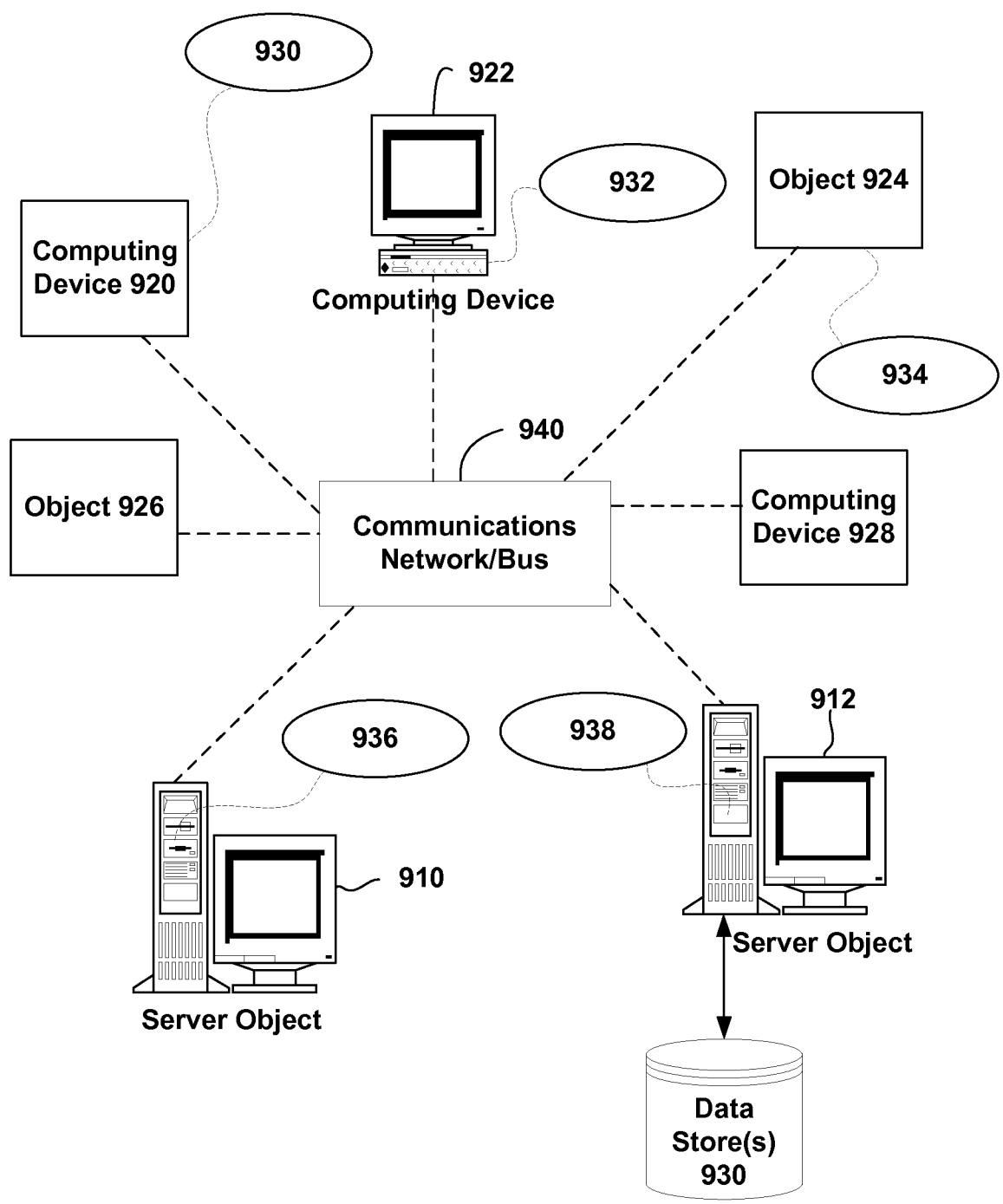
FIG. 9 is a block diagram representing exemplary non-limiting networked environments in which various embodiments described herein can be implemented.

FIG. 9 provides a schematic diagram of an exemplary networked or distributed computing environment. The distributed computing environment comprises computing objects 910, 912, etc. and computing objects or devices 920, 922, 924, 926, 928, etc., which may include programs, methods, data stores, programmable logic, etc., as represented by applications 930, 932, 934, 936, 938. It can be appreciated that computing objects 910, 912, etc. and computing objects or devices 920, 922, 924, 926, 928, etc. may comprise different devices, such as personal digital assistants (PDAs), audio/video devices, mobile phones, MP3 players, personal computers, laptops, etc.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 940, either directly or indirectly. Even though illustrated as a single element in FIG. 9, communications network 940 may comprise other computing objects and computing devices that provide services to the system of FIG. 9, and/or may represent multiple interconnected networks, which are not shown. Each computing object 910, 912, etc. or computing object or device 920, 922, 924, 926, 928, etc. can also contain an application, such as applications 930, 932, 934, 936, 938, that might make use of an API, or other object, software, firmware and/or hardware, suitable for communication with or implementation of the transaction management provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the serializable snapshot isolation systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects 910, 912, etc. can be thought of as servers where computing objects 910, 912, etc., acting as servers provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances. Any of these computing devices may be processing data, or requesting transaction services or tasks that may implicate the transaction configuration custom controls techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 940 or bus is the Internet, for example, the computing objects 910, 912, etc. can be Web servers with which other computing objects or devices 920, 922, 924, 926, 928, etc. communicate via any of a number of known protocols, such as the hypertext transfer protocol (HTTP). Computing objects 910, 912, etc. acting as servers may also serve as clients, e.g., computing objects or devices 920, 922, 924, 926, 928, etc., as may be characteristic of a distributed computing environment.

Exemplary Computing Device

As mentioned, advantageously, the techniques described herein can be applied to any device where it is desirable to facilitate provisioning of configuration custom controls. It is to be understood, therefore, that handheld, portable and other computing devices and computing objects of all kinds are contemplated for use in connection with the various embodiments, i.e., anywhere that a device may wish to read or write transactions from or to a data store. Accordingly, the below general purpose remote computer described below in FIG. 10 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 10:
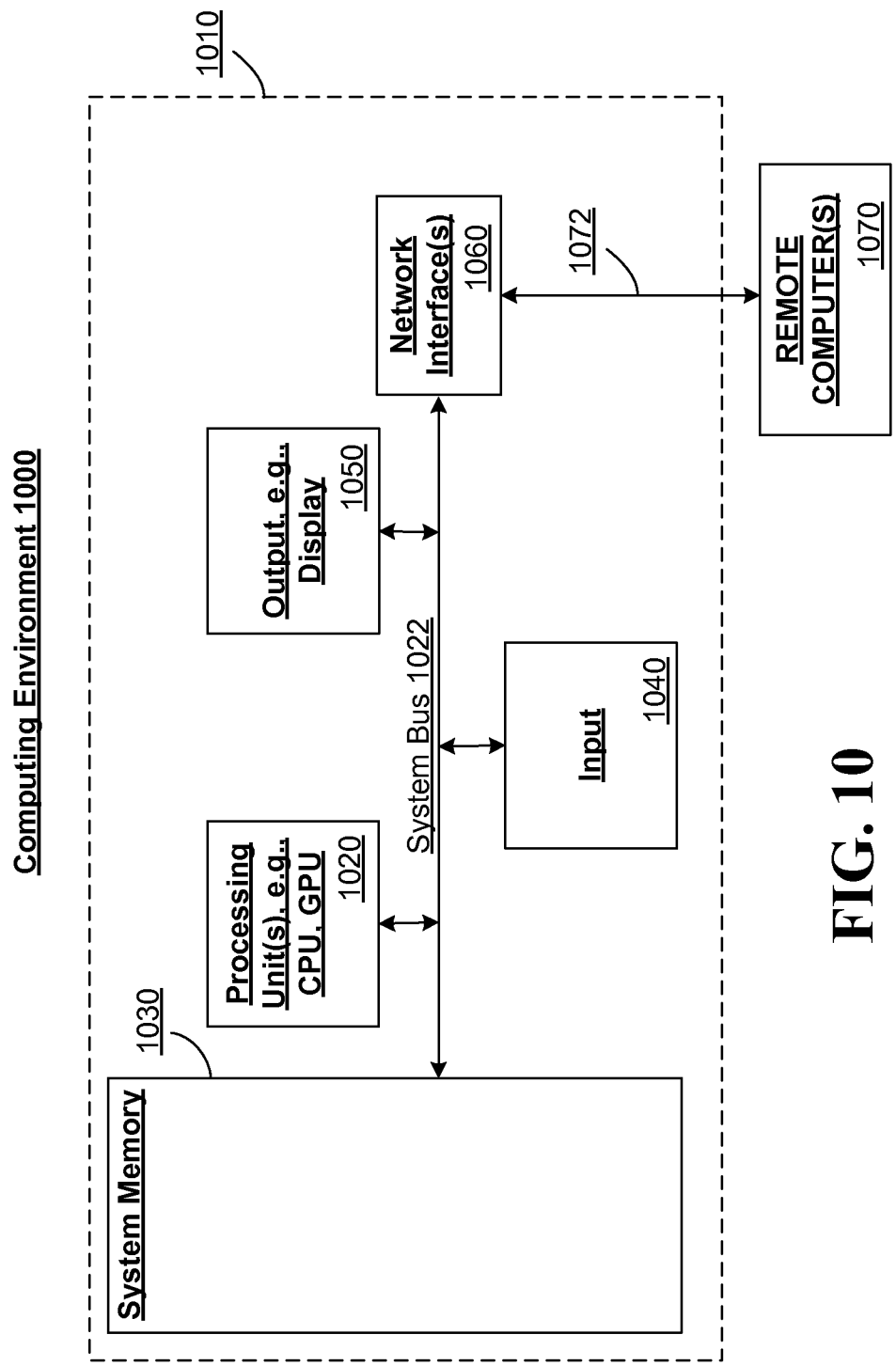
FIG. 10 is a block diagram representing an exemplary non-limiting computing system or operating environment in which one or more aspects of various embodiments described herein can be implemented.

FIG. 10 thus illustrates an example of a suitable computing system environment 1000 in which one or aspects of the embodiments described herein can be implemented, although as made clear above, the computing system environment 1000 is only one example of a suitable computing environment and is not intended to suggest any limitation as to scope of use or functionality. Neither should the computing system environment 1000 be interpreted as having any dependency or requirement relating to any one or combination of components illustrated in the exemplary computing system environment 1000.

With reference to FIG. 10, an exemplary remote device for implementing one or more embodiments includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 typically includes a variety of computer readable media and can be any available media that can be accessed by computer 1010. The system memory 1030 may include computer storage media in the form of volatile and/or nonvolatile memory such as read only memory (ROM) and/or random access memory (RAM). Computer readable media can also include, but is not limited to, magnetic storage devices (e.g., hard disk, floppy disk, magnetic strip), optical disks (e.g., compact disk (CD), digital versatile disk (DVD)), smart cards, and/or flash memory devices (e.g., card, stick, key drive). By way of example, and not limitation, system memory 1030 may also include an operating system, application programs, other program modules, and program data.

A user can enter commands and information into the computer 1010 through input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system.

Also, there are multiple ways to implement the same or similar functionality, e.g., an appropriate application programming interface (API), tool kit, driver source code, operating system, control, standalone or downloadable software object, etc. which enables applications and services to take advantage of techniques provided herein. Thus, embodiments herein are contemplated from the standpoint of an API (or other software object), as well as from a software or hardware object that implements one or more aspects of the concurrency control including validation tests described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention should not be limited to any single embodiment, but rather is to be construed in breadth, spirit and scope in accordance with the appended claims.

What is claimed is:

1. A computing system, comprising:
a processor and a memory containing instructions that when executed by the processor, cause the processor to perform a process that includes:
receiving view information associated with a default view of controls, wherein the default view of controls is based on data and default configuration information, wherein the data and the default configuration information are represented via a data-driven programming language;
receiving customized configuration information indicative of a customization of at least one aspect of the controls, wherein the customized configuration information comprises metadata; and
generating a customized view of the controls based, at least, on the default view of the controls and the customized configuration information.

2. The computing system of claim 1, wherein generating the customized view of the controls comprises overriding the default view of the controls to generate the customized view of the controls based, at least, on the metadata.

3. The system of claim 2, wherein the default view of the controls comprises a first representation and the customized view of the controls comprises a second representation.

4. The computing system of claim 3, wherein the first representation is at least one of a table, chart or graph, and wherein the second representation is at least one of a table, chart or graph, wherein the first representation differs from the second representation.

5. The computing system of claim 1, wherein generating the customized view of the controls comprises generating help text associated with a property of the controls, wherein the help text is based, at least, on the metadata.

6. The computing system of claim 1, wherein generating the customized view of the controls comprises modifying the default view of the controls to include indicia of a description of a field associated with the controls.

7. The computing system of claim 6, wherein the indicia comprises a lock and the description of the field is indicative of the field being at least one of an encrypted field or a field that requires additional security to access the field.

8. A method of configuring custom controls in a data-driven environment, comprising:
executing on a processor, instructions that, when executed, cause the processor to perform:
receiving view information associated with a default view of controls, wherein the default view of controls is based on data and default configuration information, wherein the data and the default configuration information are represented via a data-driven programming language;
receiving customized configuration information indicative of a customization of at least one aspect of the controls, wherein the customized configuration information comprises metadata; and
generating a customized view of the controls based, at least, on the default view of the controls and the customized configuration information.

9. The method of claim 8, wherein the generating the customized view of the controls comprises overriding the default view of the controls to generate the customized view of the controls based, at least, on the metadata.

10. The method of claim 9, wherein the default view of the controls comprises a first representation and the customized view comprises a second representation.

11. The method of claim 10, wherein the first representation is at least one of a table, chart or graph, and wherein the second representation is at least one of a table, chart or graph, wherein the first representation differs from the second representation.

12. The method of claim 8, wherein the generating the customized view of the controls comprises generating help text associated with a property of the controls, wherein the help text is based, at least, on the metadata.

13. The method of claim 8, wherein the generating the customized view of the controls comprises modifying the default view of the controls to include indicia of a description of a field associated with the controls.

14. The method of claim 13, wherein the indicia comprises a lock and the description of the field is indicative of the field being at least one of an encrypted field or a field that requires additional security to access the field.

15. A computer-readable storage medium storing computer-executable instructions that, when executed on a processor, cause the processor to:
- receive view information associated with a default view of controls, wherein the default view of controls is based on data and default configuration information, wherein the data and the default configuration information are represented via a data-driven programming language;
- receive customized configuration information indicative of a customization of at least one aspect of the controls, wherein the customized configuration information comprises metadata; and
- generate a customized view of the controls based, at least, on the default view of the controls and the customized configuration information.

16. The computer-readable storage medium of claim 15, wherein generating the customized view of the controls comprises overriding the default view of the controls to generate the customized view of the controls based, at least, on the metadata.

17. The computer-readable storage medium of claim 16, wherein the default view comprises a first representation and the customized view comprises a second representation, wherein the first representation differs from the second representation.

18. The computer-readable storage medium of claim 16, wherein generating the customized view of the controls comprises generating help text associated with a property of the controls, wherein the help text is based, at least, on the metadata.

19. The computer-readable storage medium of claim 16, wherein generating the customized view of the controls comprises modifying the default view of the controls to include indicia of a description of a field associated with the controls.

20. The computer-readable storage medium of claim 19, wherein the description of the field is indicative of the field being at least one of an encrypted field or a field that requires additional security to access the field.

* * * * *